United States Patent [19]
Drolen et al.

[11] Patent Number: 5,732,765
[45] Date of Patent: Mar. 31, 1998

[54] ADJUSTABLE HEAT REJECTION SYSTEM

[75] Inventors: Bruce L. Drolen, Pasadena; David B. Esposto, Redondo Beach; Ariel Gatti, San Gabriel; Calvin H. Ito, West Hills, all of Calif.

[73] Assignee: Hughes Electronics

[21] Appl. No.: 577,439

[22] Filed: Dec. 22, 1995

[51] Int. Cl.⁶ .................................................. B64G 1/50
[52] U.S. Cl. .................................. 165/41; 165/86
[58] Field of Search .......................... 165/41, 86, 904; 244/163, 173

[56] References Cited

U.S. PATENT DOCUMENTS

| | | |
|---|---|---|
| 3,260,305 | 7/1966 | Leonard et al. |
| 3,563,307 | 2/1971 | Paine . |
| 4,561,614 | 12/1985 | Olikara et al. |
| 4,738,304 | 4/1988 | Chalmers et al. |
| 5,027,892 | 7/1991 | Bannon et al. |
| 5,356,095 | 10/1994 | Aker . |

*Primary Examiner*—Allen J. Flanigan
*Attorney, Agent, or Firm*—Terje Gudmestad; Elizabeth E. Leitereg; W. K. Denson-Low

[57] ABSTRACT

A spacecraft having a spacecraft body and a heat radiator attached to the spacecraft body. The heat radiator is in thermal contact with the spacecraft body and the heat radiator moves from an initial position to a deployed position where heat is emitted therefrom. The predetermined deployed position is located at an angular position θ as measured relative to the initial position, wherein θ ranges from approximately 135° to less than 180°.

3 Claims, 9 Drawing Sheets

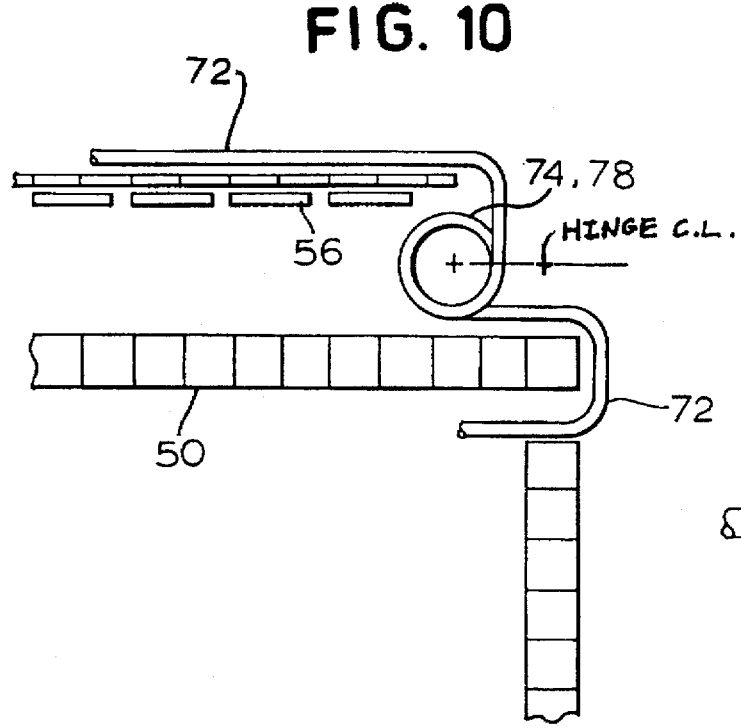
FIG. 10
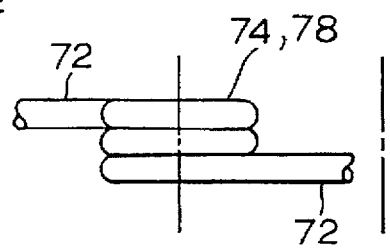
FIG. 11
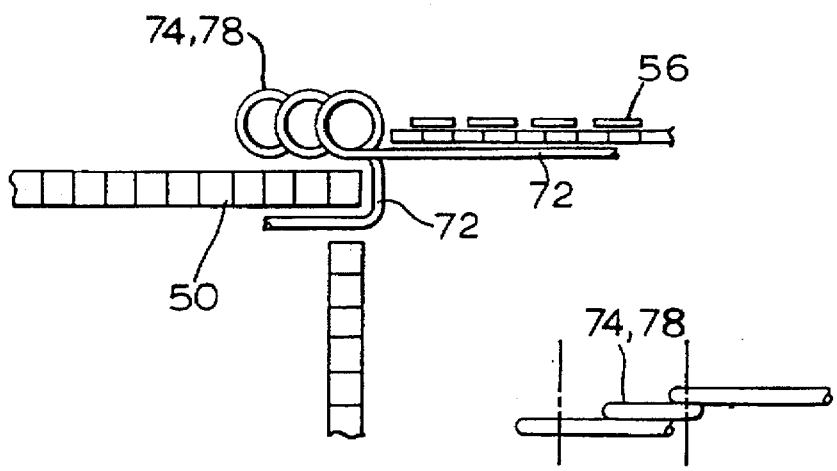
FIG. 12
FIG. 13

ADJUSTABLE HEAT REJECTION SYSTEM

BACKGROUND OF THE INVENTION

Spacecraft use a variety of structures to expel or dump heat from the spacecraft into outer space. One such structure is generally known as a deployable radiator. Deployable radiators are initially stored adjacent and parallel to a side panel of the spacecraft and then are deployed to a fixed position by rotating the radiator with respect to a hinge axis. One example of a deployable radiator is disclosed in U.S. Pat. No. 5,117,901 where the radiator is deployed by 90° relative to an initial position. Typically, the radiator is rotated by 180° to be perpendicular to the side panel and spacecraft. In its deployed position, the radiator can unnecessarily interfere with the transmission of an antenna located on the spacecraft. For example, spacecraft typically are located in an orbit where the Earth subtends an angle of approximately 18° with respect to the spacecraft, where the spacecraft is the apex of the angle. This means that the antennae of the spacecraft must be positioned within this angle to receive or transmit information. When prior radiators are rotated to the 180° position, the radiators block an angle or field of view of approximately 24°. Thus, the extended radiators tend to block the 18° field of view and, thus, there will be interference with the radio transmissions received by and transmitted by the spacecraft antennae.

SUMMARY OF THE INVENTION

The present invention provides a deployable radiator for a spacecraft. In particular, the deployable radiator of the present invention is capable of reducing interference with the transmission of antenna located on the spacecraft.

In particular, the present invention concerns a spacecraft having a spacecraft body and a heat radiator attached to the spacecraft body. The heat radiator is in thermal contact with the spacecraft body and the heat radiator moves from an initial position to a deployed position where heat is emitted therefrom. The predetermined deployed position is located at an angular position θ as measured relative to the initial position, wherein θ ranges from approximately 135° to less than 180°.

Another aspect of the present invention is a method of expelling heat generated on a spacecraft body of a spacecraft. The method entails the steps of placing a heat radiator in thermal contact with the spacecraft body and moving the heat radiator from an initial position to a deployed position which is located at an angular position θ as measured relative to the initial position, wherein θ ranges from approximately 135° to less than 180°. The method also entails emitting heat from the heat radiator at the deployed position.

The above-described deployable radiator of the present invention reduces the amount of interference with the transmission of an antenna.

The foregoing features and advantages of the present invention will be further understood upon consideration of the following detailed description of the invention taken in conjunction with the accompanying drawings, in which:

BRIEF DESCRIPTION OF THE DRAWINGS

FIG. 10 shows an embodiment of a flex coil to be used with the closed loop heat pipe network of FIG. 8 when in a stowed configuration;

FIG. 11 shows a side view of the flex coil of FIG. 10;

FIG. 12 shows the flex coil of FIG. 10 when in a deployed position;

FIG. 13 shows a side view of the flex coil of FIG. 12;

DESCRIPTION OF THE PREFERRED EMBODIMENT

Figure 1:
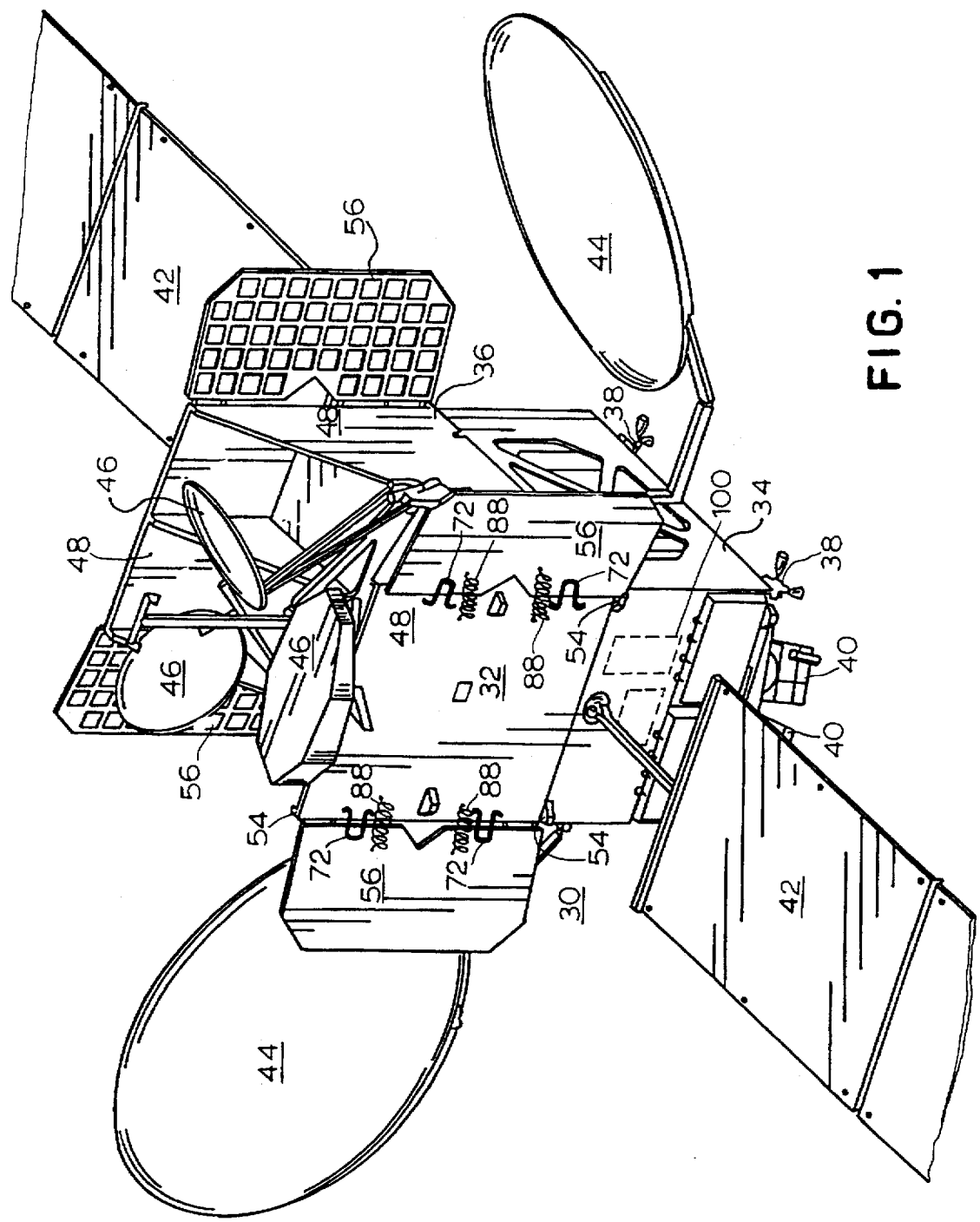
FIG. 1 shows a spacecraft capable of utilizing a movable heat radiator of the present invention.
Figure 2:
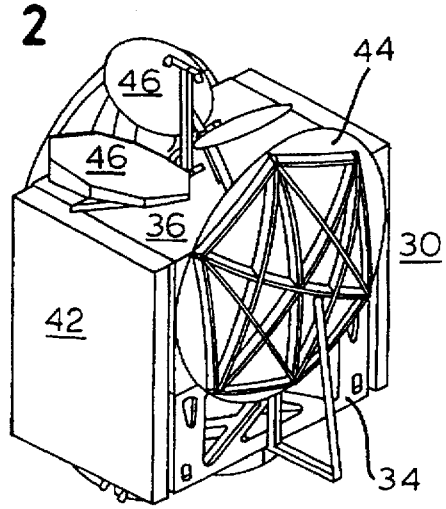
FIG. 2 shows the heat radiator in a retracted or stowed configuration for the spacecraft of FIG. 1.

A spacecraft or satellite 30 capable of utilizing the deployable radiator of the present invention is shown in FIGS. 1–2. Satellite 30 has a spacecraft body 32 which includes a lower bus module 34 and an upper payload module 36. Attached to the aft end of the lower bus module 34 are a plurality of engines. These engines include a centrally positioned liquid orbital thruster (not shown) and four chemical propulsion engines 38 located at the corners of the bus module 34 and two pairs of xenon ion propulsion engines 40. Lower bus module 34 contains propellant tanks (not shown) and various power and control electronics which operate the engines and power the payload module 36. Bus module 34 further includes a pair of solar panels 42 which convert sunlight into electricity that is sent to batteries (not shown) located on the bus module 34. Bus module 34 and payload module 36 also support one or more receivers, such as antennae 44 and reflectors 46, which can be used to receive control signals from a ground station, and also send signals to the ground station.

Payload module 36 is attached to the bus module 34 and contains a variety of electronic equipment which may include additional communication antennae (not shown). The electronic equipment processes information gathered by the antennae 34 and reflectors 36, and sends the processed information back to the ground station via antennae 34 and/or reflectors 36.

Figure 3:
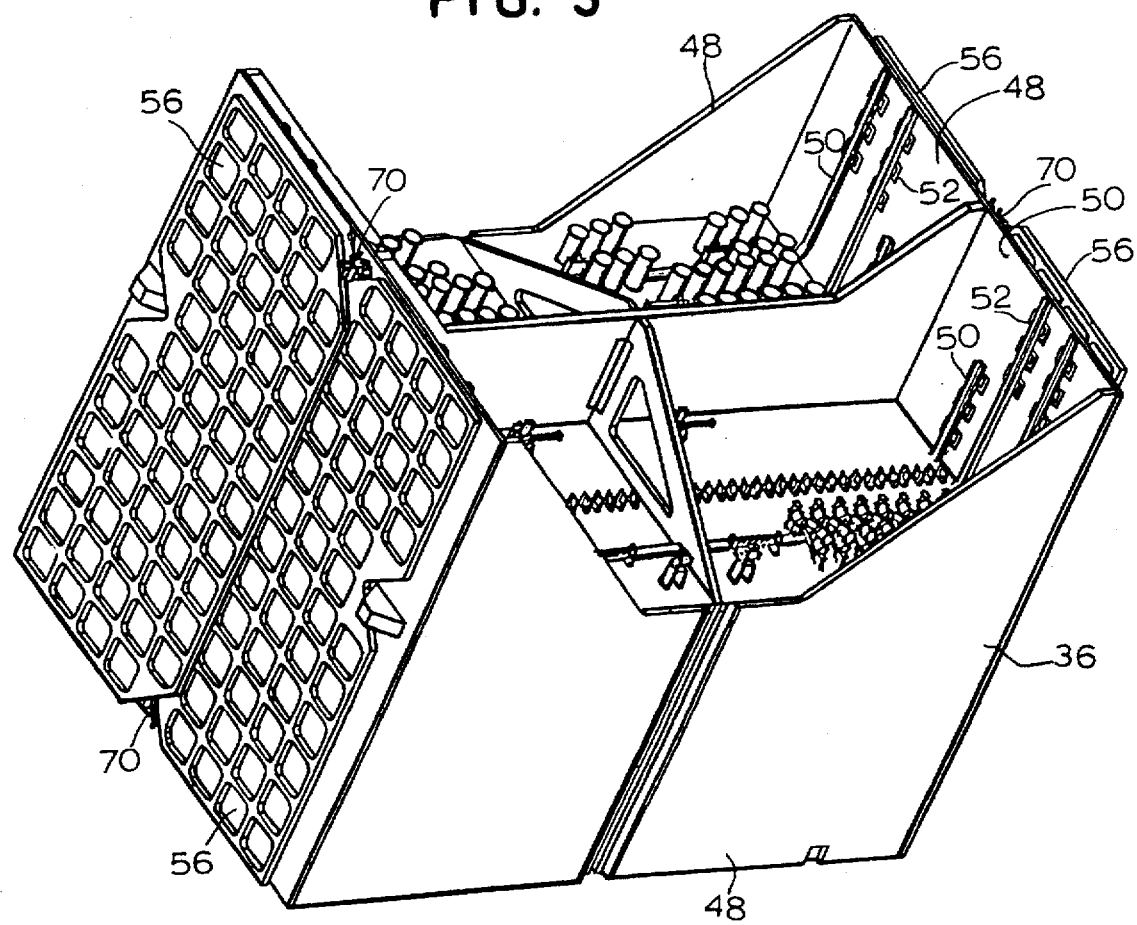
FIG. 3 shows an enlarged view of the heat radiator in a retracted or stowed configuration for the spacecraft of FIG. 1.
Figure 4:
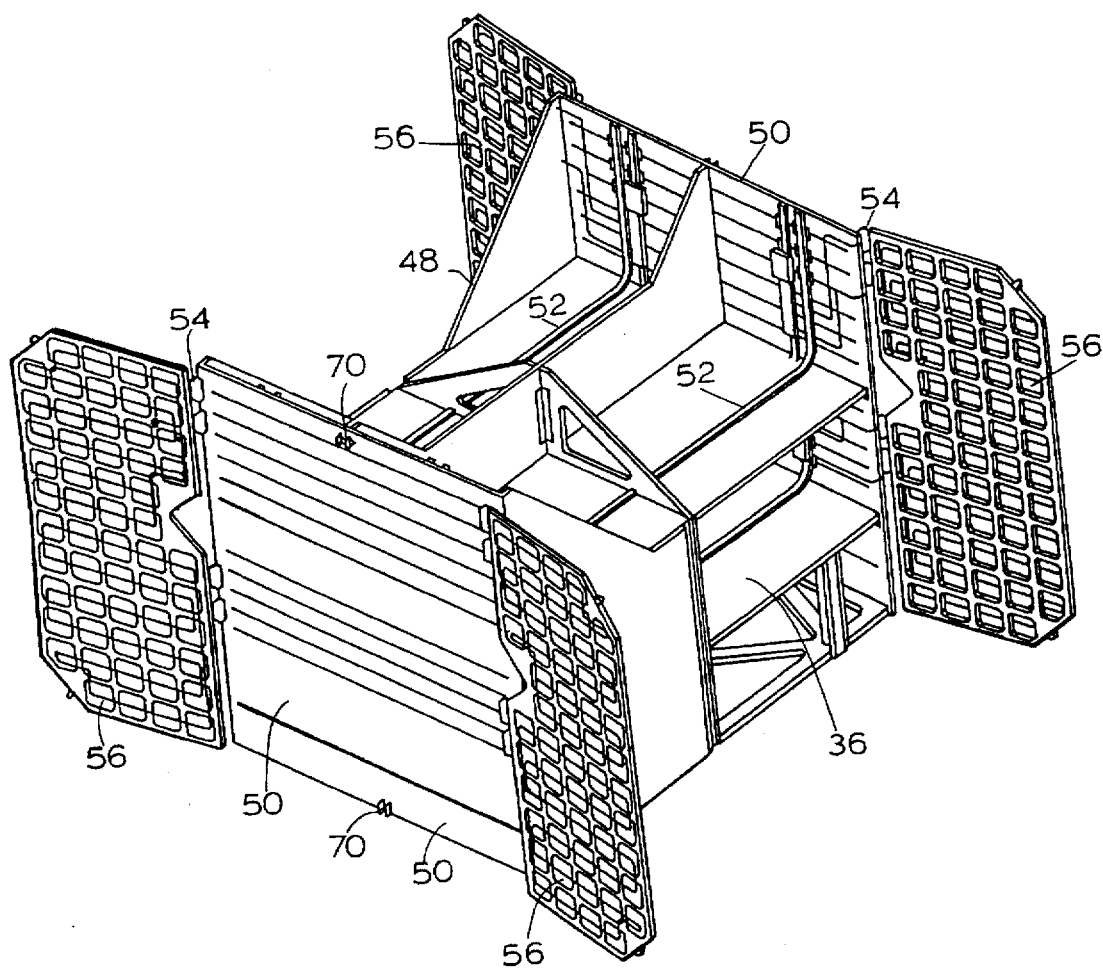
FIG. 4 shows a partially cut away view of the heat radiator in a deployed configuration for the spacecraft of FIG. 1.
Figure 6:
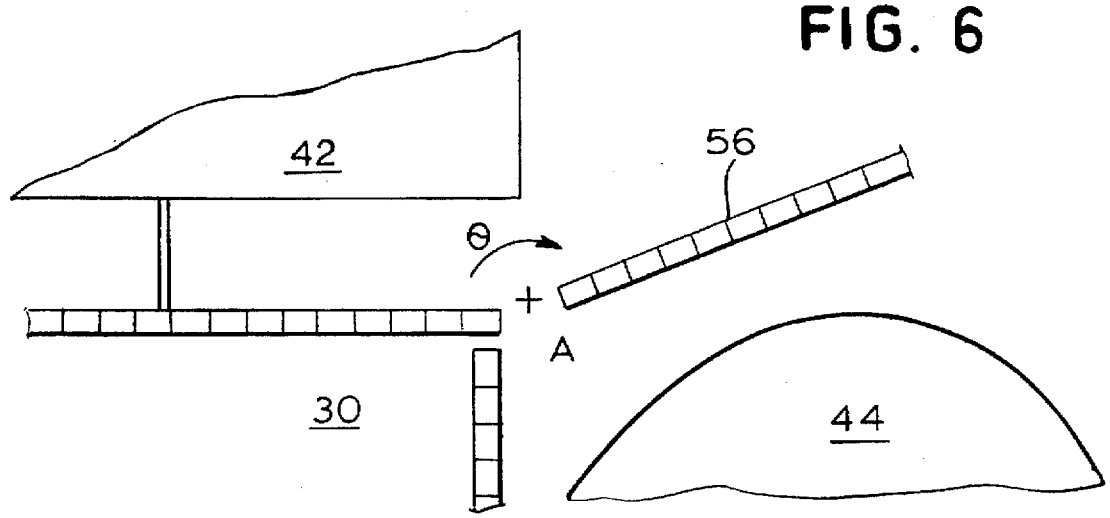
FIG. 6 shows a cross-sectional view of the heat radiator of FIG. 1.
Figure 5:
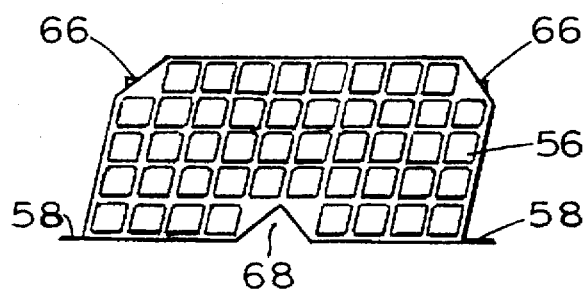
FIG. 5 shows a top view of the heat radiator of FIG. 1.

Payload module 36 has four side panels 48 which meet at four corners. As shown in FIGS. 3 and 4, two or more of the side panels 48 may be fixed heat radiators 50 that have one or more heat pipes 52 in thermal communication with the fixed radiator 50. The operation of heat pipes 52 will be explained in detail below. At each corner of the side panels 48 are a pair of connectors 54 which are hingedly attached to a deployable heat radiator 56 via a pivot member 58. As shown in FIG. 5, pivot member 58 may include a pair of pins or rods 60 extending from each end of the deployable heat radiator 56. In this case, each connector 54 preferably has an opening to receive and engage one of the pins or rods 60. The deployable heat radiator 56 is then able to rotate about an axis, A, aligned with the longitudinal axis of the pins or rods 60, as shown in FIG. 6.

Figure 7:
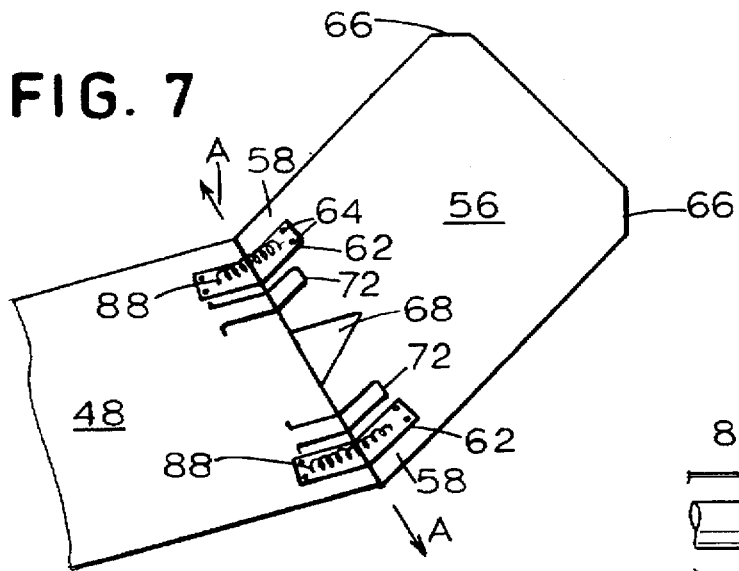
FIG. 7 schematically shows a hinge to be used with the movable heat radiator of FIG. 6.

In another embodiment shown in FIG. 7, the pivot member 58 may be one or more hinges 62 which are attached to the deployable heat radiator 56 and the outboard side of side panel 48 in a well known manner, such as rivets 64. Like the embodiment with pins 60, the deployable heat radiator 56 is able to rotate about an axis, A, defined by the hinge 62.

As shown in FIG. 5, each deployable heat radiator 56 is generally rectangular in shape with a pair of truncated corners 66 and a notch 68. Deployable heat radiator 56 preferably has a length of approximately 84", a width of approximately 37" and a thickness of approximately 1". The deployable heat radiator 56 is constructed by using a rectangular honeycomb structure made from aluminum or kevlar and having dimensions corresponding to that of the deployable heat radiator 56. Such a honeycomb structure is available from various sources, such as the Excel, Unicel or Plascore companies. The honeycomb structure then has a pair of rectangular aluminum sheets which are attached to each side of the honeycomb structure via a room temperature vulcanized rubber or by well known film adhesive, such as those film adhesives known by the names of FM 300 or BASF 1146. In the case of attachment via vulcanized rubber, the rubber is preferably loaded with an iron filler thereby increasing the thermal conductivity of the rubber. Furthermore, the exterior of the deployable heat radiator 56 may be further blanketed with KAPTON™, which is a neutral layer that limits the radiation of heat on both sides of the radiator. For increased radiative capability, glass mirrors (not shown) are bonded on top of the aluminum substrate. It is understood that other materials for the honeycomb structure which have similar structural and thermophysical properties as aluminum or kevlar could be substituted without straying from the scope of the present invention. The truncated corners 66 and notch 68 are shaped so that any latches or launch locks (not shown) used on the solar panels 42 can be accommodated when the satellite 30 is in the stowed configuration, as shown in FIGS. 2 and 3.

As shown in FIG. 3, one or more latches or launch locks 70 attached to the payload module 36 retain the deployable heat radiators 56 in a stowed or initial position adjacent to and parallel to a side panel 48 of the payload module 36 during launch of the satellite 30. An example of launch lock 70 and its attachment to the deployable heat radiator 56 is a well known bolt cutter-type mechanism. The solar panels 42 are folded also so as to cover the deployable heat radiators 56. In an embodiment not shown, the initial position of the deployable heat radiators 56 may lie within the spacecraft body 32 itself to provide additional protection for the deployable heat radiator 56.

After the satellite 30 is launched, it leaves the launch vehicle (not shown). At this stage of the mission, the satellite 30 will propel itself along a transfer orbit to a position in space where it can enter a desired geosynchronous orbit. However, prior to entering the transfer orbit, antennae 44 and reflectors 46 receive a command signal from the ground station. A signal is sent to the solar panels 42 which causes them to unfold to the configuration shown in FIG. 1. The solar panels 42 are deployed to power the xenon thrusters 40 that propel the satellite 30 along the transfer orbit. As shown in FIGS. 2 and 3, launch locks 70 retain each deployable heat radiator 56 in its stowed configuration while the satellite 30 moves in the transfer orbit. The extreme temperatures encountered during the transfer orbit reduce the need to reject heat from the satellite 30. Since the deployable heat radiators 56 are not needed to perform their main function of expelling heat, they preferably each cover a fixed heat radiator 50 to insulate the satellite 30 from the extreme cold space temperature. The KAPTON™ blanket on the exterior of the deployable heat radiators 56 adds an additional layer of insulation to protect the fixed radiators 50.

After the transfer orbit is achieved, a second signal is sent either automatically or via ground command signal to the launch locks 70 when heat rejection from within the satellite 30 is necessary, causing the launch locks 70 to disengage from the deployable heat radiators 56. In one embodiment, the launch locks 70 are opened by detonating explosive charges in the locks 70. Disengagement from the launching locks 70 results in the deployable heat radiators 56 moving from their initial stowed position to a deployed position, as shown in FIGS. 6 and 7, where heat is emitted from the deployable heat radiators 56.

Figure 8:
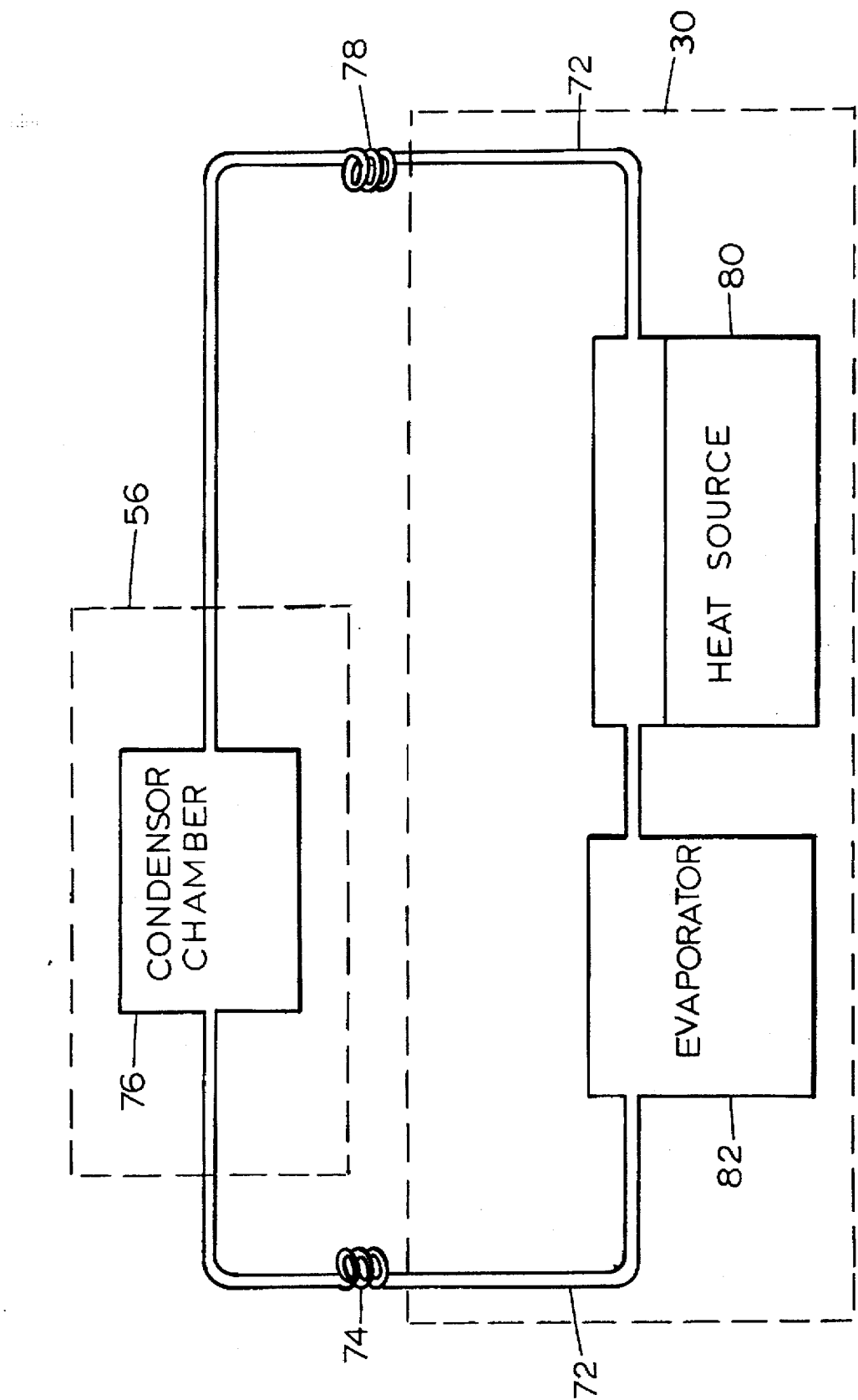
FIG. 8 schematically shows a closed loop heat pipe network to be used with the spacecraft of FIG. 1.

In the deployed position, a closed network of heat pipes 52 and 72 transfer heat from the satellite 30 to the fixed and deployable heat radiators, respectively. FIGS. 1 and 8 show one possible embodiment for a heat pipe network. In particular, each deployable heat radiator 56 is in thermal contact with the payload module 36 via a pair of looped heat pipes, portions of which are shown at reference numeral 72. Each looped heat pipe 72 originates in the interior of satellite 30 and extends to the exterior of deployable heat radiator 56 where it then returns back into the satellite 30 to where it originated so as to form a closed loop as shown in FIG. 8. The heat pipe 72 contains a fluid, such as liquid ammonia, and uses a capillary effect to transport hot vapor generated by the bus module 34 and payload module 36 to the deployable heat radiator 56. Heat pipe 72 transports vapor along its length, through a flex coil 74, to the deployable heat radiator 56 where heat is expelled from the spacecraft 30. Release of the heat results in the vapor cooling and entering the condensation chamber 76 where it condenses into a liquid. The condensed liquid is returned through a second flex coil 78 to the satellite 30 via capillary forces. The liquid then receives heat from one or more heat sources 80 on the spacecraft 30 and is vaporized in evaporator 82 where then the above-described process is repeated. The above process occurs, with the exception of flex coils 74, 78, in a similar manner for the fixed heat radiators 50.

Heat pipe 72 preferably is bonded to the outer surface of the deployable heat radiator 56 by a film adhesive, such as BASF 1146. Thus, the heat is conductively transmitted to the deployable heat radiator 56 which then transmits the heat into outer space. An example of a possible composition for a heat pipe 72 in general is disclosed in U.S. Pat. No. 4,515,209, whose contents are incorporated herein by reference.

Figure 9:
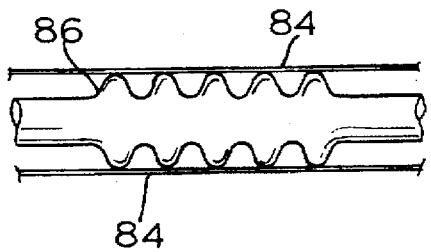
FIG. 9 shows the bellows structure of a flex coil used with the heat pipe network of FIG. 8.

Flex coils 74, 78 are fastened on one end to a fixed heat radiator panel 50 and on the other end to a deployable heat radiator 56. As shown in FIG. 9, each flex coil 74, 78 has a flexible stainless steel outer sheath 84 and a corrugated bellows tube 86 within the sheath 84, such bellows tubes 86 being well-known in the art. The bellows tube 86 will also be made of a flexible metal material.

In the stowed configuration of FIGS. 10 and 11, flex coils 74, 78 are located substantially between the fixed radiator 50 and the deployable heat radiator 56. Furthermore, the individual flex coils 74, 78 are concentric with each other.

FIGS. 12 and 13 illustrate the position of flex coils 74, 78 relative to the hinge axis A, after the deployable heat radiators 56 move to the deployed position. The flex coils 74, 78 are pivoted on the fixed heat radiator panels 50, and stretch and sweep in an arcuate fashion during deployment. The flex coils 74, 78 complete their arcuate sweep in substantially the same plane on which the flex coils 74, 78 rested while in the stowed position. The flex coils 74, 78 accordingly, do not twist or bend. This prevents the flex coils 74, 78 from overstressing or collapsing on themselves, and ultimately interfering with the heat rejection process. After the deployable heat radiators 56 are deployed, the coils 74, 78 are no longer concentric and only a portion of the flex coils 74, 78 are aligned with the hinge axis A. In the preferred embodiment, flex coils 74, 78 are positioned such that they will not make contact with a pivot member 58 whether a deployable heat radiator 56 is in the stowed or deployed positions.

Another possible embodiment for flex coils 74, 78 is shown in FIGS. 14-18. Instead of the circular coiled shape of FIGS. 10-13, flex coils 74, 78 each are made of a flexible material, such as aluminum, and have a serpentine shape to transport the vapor to the deployable heat radiator 56 and return the condensed liquid from the deployable heat radiator 56 to the evaporator 82 located on the satellite 30. As with the coiled embodiment of FIGS. 10-13, flex coils 74, 78 are fastened on one end to the fixed radiator panel 50 and on the other end to the deployable heat radiator 56. Note that the serpentine sections each have a shape which is very similar to the shape of the cooling coils of a refrigerator.

Figure 15:
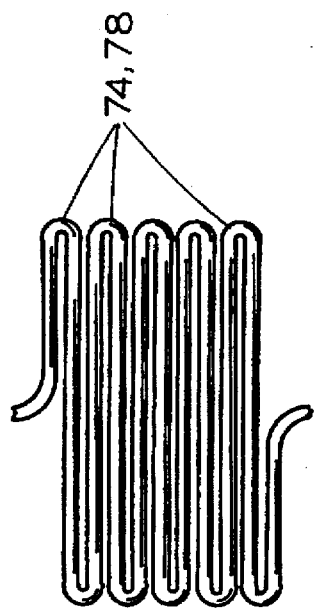
FIG. 15 shows a side view of the flex coil of FIG. 14.
Figure 14:
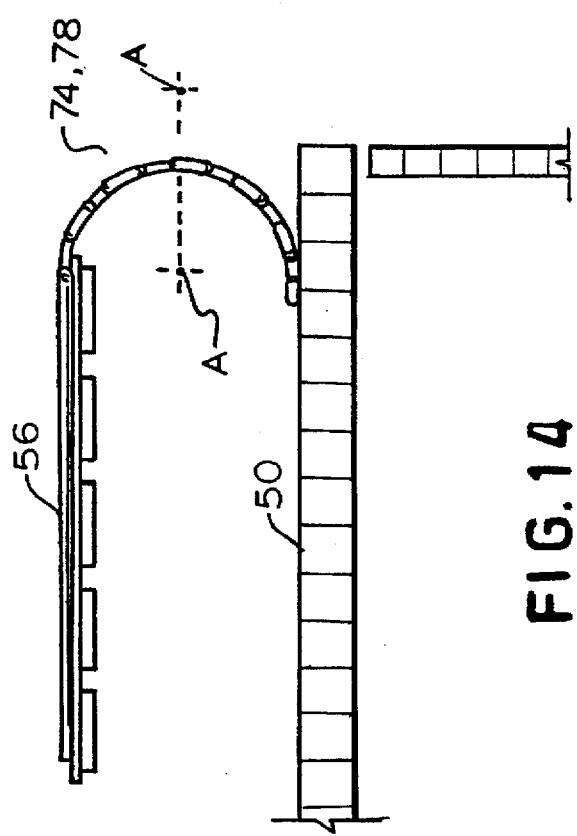
FIG. 14 shows a second embodiment of a flex coil to be used with the closed loop heat pipe network of FIG. 8 when in a stowed configuration.
Figure 16:
FIG. 16 shows an side view of the flex coil of FIG. 14.

FIG. 14 is an illustration of the positioning of a serpentine flex coil 74, 78 relative to hinge axis A when deployable heat radiator 56 is in a stowed position. FIG. 14 illustrates that the flex coils 74, 78 can be in front of, aligned with or in back of the axis of rotation A. The serpentine flex coil 74, 78 forms an arc between the fixed radiator panel 50 and the deployable heat radiator 56. In addition, flex coils 74, 78 are each folded over itself which tends to compress its loops. FIG. 15 is a side view of the serpentine flex coils 74, 78 in the stowed position. FIG. 16 also shows the U-shaped curves that make-up the serpentine flex coils 74, 78.

Figure 17:
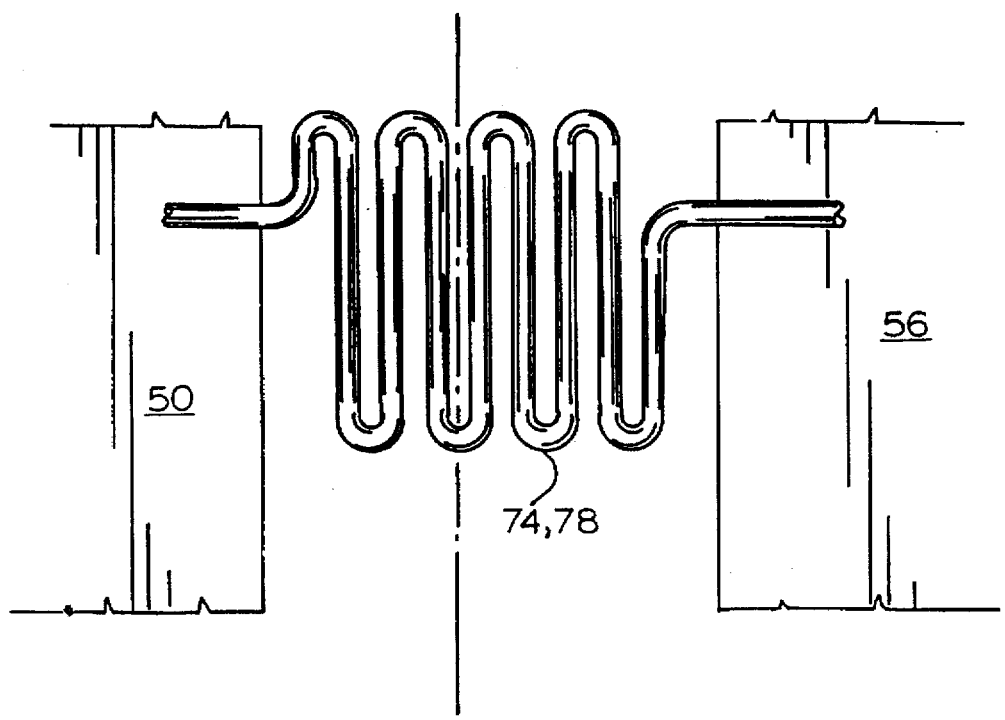
FIG. 17 shows the flex coil of FIG. 14 when in a deployed position.
Figure 18:
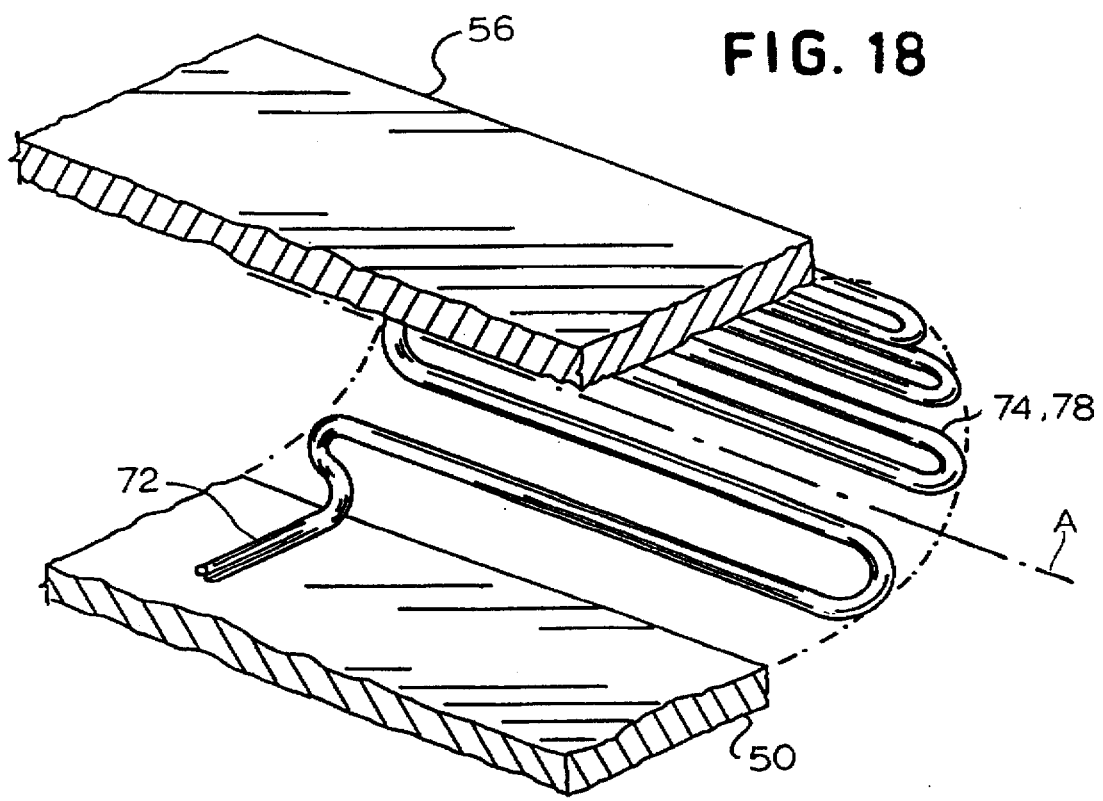
FIG. 18 shows a isometric view of the flex coil of FIG. 17.

FIG. 16 illustrates the path of a flex coil 74, 78 relative to a hinge axis A, where portions of the serpentine flex coils 74, 78 are shown passing through the hinge axis A and unfolding as the deployable heat radiator 56 deploys. If the deployable heat radiator 56 is fully deployed, the serpentine flex coil 74, 78 will lie in substantially the same plane as the deployable heat radiator 56. This prevents the flex coil 74, 78 from overstressing, twisting or collapsing on itself, and ultimately from interfering with the heat rejection process. As with their coiled counterparts of FIGS. 10-13, the serpentine flex coils 74, 78 are positioned such that they will not make contact with a pivot member 58, notwithstanding that a deployable heat radiator 56 is in the stowed or deployed position. FIG. 17 is a top of view of the serpentine flex coil 74, 78 of FIG. 15 in the deployed position. FIG. 18 is an isometric view of a serpentine flex coil 74, 78 in the folded or stowed position, relative to an axis of rotation A for a deployable heat radiator 56.

For both embodiments of the flex coils 74, 78 described above with respect to FIGS. 10-18, once the launch locks 70 are opened, the flex coils 74, 78 will decompress and assist in the deployment of the deployable heat radiator 56 a first predetermined position to a second predetermined position with respect to the satellite 30.

Besides flex coils 74, 78, the deployable heat radiator 56 is rotated by a biasing mechanism. As mentioned previously, deployable heat radiator 56 is attached to the connectors 54 by a pivot member 58 which can include either pin 60 or hinge 62. In both embodiments, a spring mechanism, such as spring 88, can be employed which is attached to side panel 48 and deployable heat radiator 56 as shown in FIG. 7. The spring 88 is prestressed to bias the deployable heat radiator 56 to rotate about an axis of rotation A by a predetermined angular amount θ so that the heat radiator 56 moves from the initial position to the deployed position when the launch locks 70 are disengaged from the deployable heat radiator 56 as shown in FIG. 6. The spring mechanism preferably includes a well known damping mechanism attached to side panel 48 and deployable heat radiator 56 that will counteract the spring bias so that the radiator will move to the predetermined angle θ without overshooting or oscillating about θ.

Figure 19:
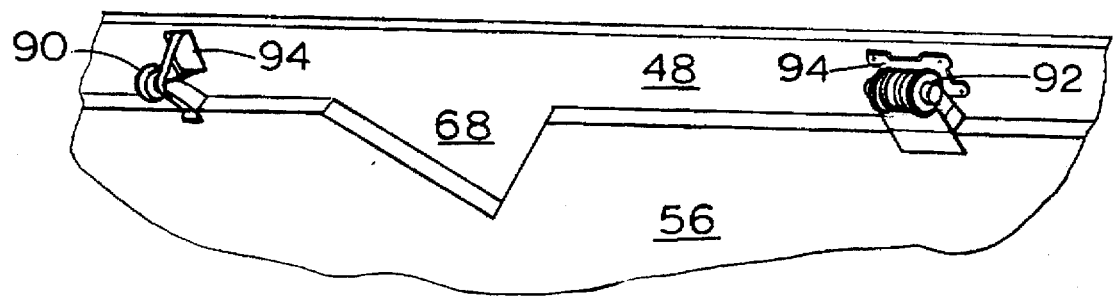
FIG. 19 shows an embodiment of a spring mechanism capable of being utilized with the movable radiator of the present invention.
Figure 20:
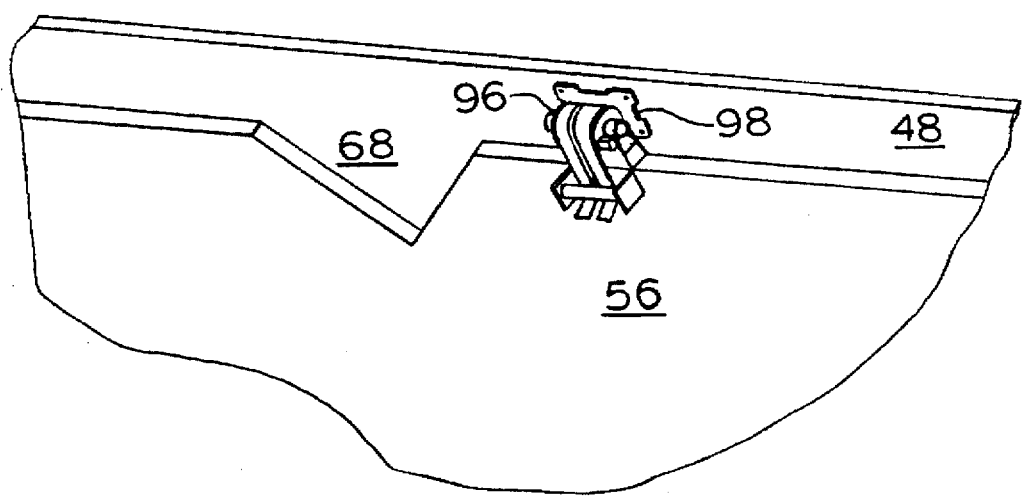
FIG. 20 shows another embodiment of a spring mechanism capable of being utilized with the movable radiator of the present invention.

Two possible embodiments for the spring mechanism are shown in FIGS. 19 and 20. In FIG. 19, there is shown a spring actuator 90 and a damper 92 located on either side of notch 68. Spring actuator 90 and damper 92 are attached to side panel 48 and deployable heat radiator 56 via a bracket 94. The spring actuator 90 includes an axle which allows pivoting motion of deployable heat radiator 56 about the axle. Spring actuator 90 also includes a spring that is prestressed and attached to the deployable heat radiator 56 so as to move it towards the predetermined position θ. Damper 92 counteracts the spring actuator 90 so that the deployable heat radiator 56 rotates to the desired angle θ without overshooting or oscillating about θ. Damper 92 contains a fluid with a rotating wheel immersed therein. The rotating wheel's axle allows for pivoting of the deployable heat radiator 56. Furthermore, the fluid is chosen so it can withstand the rigors of space and provide sufficient damping of the wheel so that the deployable heat radiator 56 moves to the predetermined position.

Another possible embodiment for the spring mechanism is shown in FIG. 20. FIG. 20 shows that the spring actuator and damper can be combined into a single mechanism 96 which is attached to a bracket 98 that is connected to both the side wall 48 and deployable heat radiator 56. Mechanism 96 has an axle which allows the deployable heat radiator 56 to pivot thereabout. As before, mechanism 96 includes a spring which moves the deployable heat radiator 56 towards the predetermined position. Mechanism 96 further includes a damper to slow the inertia of the deployable heat radiator 56 caused by the spring so that the deployable heat radiator 56 rests at the predetermined position without overshooting or oscillating about the predetermined position. When either of the embodiments of the flex coils 74, 78 are used in combination with spring 78, spring actuator 90 or mechanism 96 they together make up the spring mechanism so as to bias the deployable heat radiator 56 to the deployed position by an angular amount θ relative to the initial position. θ will typically range from approximately 135° to less than 180°.

As mentioned previously, prior fixed heat radiators are unfolded by θ=180° to the deployed position so that they subtend a field of view corresponding to an angle of approximately 24° (12° half angle). Since this angle is greater than the 18° angle needed for transmission by the antennae, interference will result. To overcome this deficiency, the predetermined deployed position can be chosen such that the amount that the deployable heat radiator 56 blocks transmissions from the antennae 44 is reduced by as much as approximately 40% when compared with prior radiator geometries, where the radiator is deployed to an angle θ=180° as measured relative to its initial position when folded parallel to the spacecraft body. By deploying the radiator 56 by an angular amount θ ranging from 135° to less than 180°, the present invention reduces the field of view blocked by the radiators 56 to approximately 14° (θ=135°), a reduction of almost 42%. Thus, the interference is reduced and since the field of view is less than 18°, it is possible to reposition the antennae so that they can receive angles within the 6° of angle that is unblocked by the radiators 56.

Many times antennae interference will be caused by the independent movement of the solar panels 42 and antennae 44. For example, the deployable heat radiator 56 may be at an initial position where interference is minimized, but a movement of the solar panels 42 and antennae 44 will upset this balance so that interference will increase. In this case, the pivot member 58 can be coupled to a motor 100 (located within either module 32 or 34 and denoted by dashed lines) so the motor 100 rotates the deployable heat radiator 56 by an angular amount θ from the initial position to a second position so that interference is reduced or minimized. Constructing a motor 100 to rotate an object is, in general, well within the capability of one of ordinary skill in the art. Motor 100 receives a command signal from on board or from the ground via antennae 44 and reflectors 46 which directs the motor 100 to rotate the deployable heat radiator 56 by θ to reduce or minimize interference.

Summarizing, the present invention regards a deployable heat radiator in which the position of the deployable heat radiator can be controlled to such an extent that interference with antennae transmissions is reduced.

The foregoing description is provided to illustrate the invention, and is not to be construed as a limitation. Numerous additions, substitutions and other changes can be made to the invention without departing from its scope as set forth in the appended claims. For example, one or more sections of the heat pipe network is shielded from deleterious elements in outer space such as micrometeorites.

We claim:

1. A spacecraft comprising:

a spacecraft body;

a heat radiator attached to said spacecraft body and in thermal contact with said spacecraft body, wherein said heat radiator moves from an initial position to a predetermined deployed position where heat is emitted therefrom, said predetermined deployed position being located at an angular position ⊖ as measured relative to said initial position, wherein ⊖ ranges from approximately 135° to less than 180°;

a pivot member for attaching said heat radiator to said spacecraft body and pivoting said heat radiator about an axis of rotation to said predetermined deployed position;

a latch which engages and holds said heat radiator at said initial position;

a heat pipe attached to said spacecraft body and said heat radiator, said heat pipe transporting heat, via a fluid, from said spacecraft body to said heat radiator and biasing said heat radiator to move from said initial position to said deployed position when said latch is disengaged from said heat radiator;

wherein said heat pipe has at least one flexible section, connected on one end to said spacecraft body and on the other end to said heat radiator, and having a serpentine configuration including a plurality of U-shaped curves.

2. A spacecraft comprising:

a spacecraft body;

a heat radiator attached to said spacecraft body and in thermal contact with said spacecraft body, wherein said heat radiator moves from an initial position to a predetermined deployed position where heat is emitted therefrom, said predetermined deployed position being located at an angular position ⊖ as measured relative to said initial position, wherein ⊖ ranges from approximately 135° to less than 180°;

a pivot member for attaching said heat radiator to said spacecraft body and pivoting said heat radiator about an axis of rotation to said predetermined deployed position;

a latch which engages and holds said heat radiator at said initial position;

a heat pipe attached to said spacecraft body and said heat radiator, said heat pipe transporting heat, via a fluid, from said spacecraft body to said heat radiator and biasing said heat radiator to move from said initial position to said deployed position when said latch is disengaged from said heat radiator;

wherein said heat pipe has at least one flexible section, connected on one end to said spacecraft body and on the other end to said heat radiator, and having a helically coiled configuration including a plurality of coils, said plurality of coils having a common centerline when said heat radiator is in said initial position, said centerline being parallel and non-coincident to said axis of rotation of said pivot member.

3. The spacecraft of claim 2 wherein said plurality of coils are non-concentric when said heat radiator is in said deployed position.

* * * * *